(12) United States Patent
Clark et al.

(10) Patent No.: US 10,843,781 B2
(45) Date of Patent: Nov. 24, 2020

(54) FOOT PEDAL FOR A TROLLING MOTOR ASSEMBLY

(71) Applicant: NAVICO HOLDING AS, Egersund (NO)

(72) Inventors: Jeremiah D. Clark, Tulsa, OK (US); Jeremy J. Schroeder, Sapulpa, OK (US); Paul Robert Bailey, Auckland (NZ); Dustyn P. Pendergraft, Claremore, OK (US)

(73) Assignee: NAVICO HOLDING AS, Egersund (NO)

( * ) Notice: Subject to any disclaimer, the term of this patent is extended or adjusted under 35 U.S.C. 154(b) by 1 day.

(21) Appl. No.: 16/276,033

(22) Filed: Feb. 14, 2019

(65) Prior Publication Data

US 2019/0176953 A1  Jun. 13, 2019

Related U.S. Application Data

(62) Division of application No. 15/835,752, filed on Dec. 8, 2017, now Pat. No. 10,513,322.

(51) Int. Cl.
*B63H 21/21* (2006.01)
*B63H 20/00* (2006.01)

(52) U.S. Cl.
CPC ........... *B63H 21/21* (2013.01); *B63H 20/007* (2013.01)

(58) Field of Classification Search
CPC .............................. B63H 21/21; B63H 20/007
See application file for complete search history.

(56) References Cited

U.S. PATENT DOCUMENTS 2,877,733 A    3/1959 Harris
3,598,947 A    8/1971 Osborn
(Continued)

FOREIGN PATENT DOCUMENTS

EP        1 891 461 B1    5/2014
WO   WO 95/28682 A1    10/1995
(Continued)

OTHER PUBLICATIONS

Minn Kota RIPTIDE ST Foor Pedal Accessory User Manual [retrieved Dec. 7, 2017] <file:///C:/Users/PForbes/Downloads/2377123rc_RT_ST_Foot_Pedal_Manual.pdf.> 4 pages.
(Continued)

*Primary Examiner* — Anthony D Wiest
(74) *Attorney, Agent, or Firm* — Nelson Mullins Riley & Scarborough LLP

(57) ABSTRACT

A user input assembly for controlling operation of a trolling motor assembly including a propulsion motor, the user input assembly having an input device housing defining a top surface that is configured to receive a user's foot thereon, wherein the top surface defines a left edge and right edge, a support plate, wherein the input device housing is pivotably mounted to the support plate, and a switch that is selectively secured to the input device housing in one of a first position and a second position, wherein the first position is proximate the left edge of the input device housing, the second position is proximate the right edge of the input device housing, and the switch is movable between an open position and closed position so that the power is supplied to the propulsion motor.

20 Claims, 12 Drawing Sheets

(56) References Cited

U.S. PATENT DOCUMENTS

| | | | |
|---|---|---|---|
| 3,807,345 A | 4/1974 | Peterson | |
| 5,892,338 A | 4/1999 | Moore et al. | |
| 6,054,831 A | 4/2000 | Moore et al. | |
| 6,325,684 B1 * | 12/2001 | Knight | B63H 20/007 114/144 RE |
| 6,447,347 B1 | 9/2002 | Steinhauser | |
| 6,507,164 B1 | 1/2003 | Healey et al. | |
| 6,524,144 B2 | 2/2003 | Pasley | |
| 6,661,742 B2 | 12/2003 | Hansen | |
| 6,678,589 B2 | 1/2004 | Robertson et al. | |
| 6,870,794 B2 | 3/2005 | Healey | |
| 6,902,446 B1 | 6/2005 | Healey | |
| 6,909,946 B1 | 6/2005 | Kabel et al. | |
| 6,919,704 B1 | 7/2005 | Healey | |
| 7,004,804 B2 | 2/2006 | Bernloehr et al. | |
| 7,195,526 B2 | 3/2007 | Bernloehr et al. | |
| 7,268,703 B1 | 9/2007 | Kabel et al. | |
| 7,303,595 B1 | 12/2007 | Janitz | |
| 7,452,251 B2 | 11/2008 | Boebel | |
| 7,538,511 B2 | 5/2009 | Samek | |
| D594,034 S | 6/2009 | Bernloehr et al. | |
| 7,722,417 B2 | 5/2010 | Bernloehr et al. | |
| 8,106,617 B1 | 1/2012 | Holley | |
| 8,221,175 B2 * | 7/2012 | Mynster | B63H 20/12 114/144 R |
| 8,305,844 B2 | 11/2012 | DePasqua | |
| 8,645,012 B2 | 2/2014 | Salmon et al. | |
| 8,761,976 B2 | 6/2014 | Salmon et al. | |
| 8,814,129 B2 | 8/2014 | Todd et al. | |
| 8,879,359 B2 | 11/2014 | DePasqua | |
| 8,888,065 B2 | 11/2014 | Logan | |
| 8,991,280 B2 | 3/2015 | Wireman | |
| 9,127,707 B1 | 9/2015 | Huntley | |
| 9,132,900 B2 | 9/2015 | Salmon et al. | |
| 9,160,210 B2 | 10/2015 | Perry | |
| 9,162,743 B2 | 10/2015 | Grace et al. | |
| 9,278,745 B2 | 3/2016 | Kooi, Jr. et al. | |
| 9,290,256 B1 | 3/2016 | Wireman et al. | |
| 9,296,455 B2 | 3/2016 | Bernloehr et al. | |
| 9,322,915 B2 | 4/2016 | Betts et al. | |
| 9,394,040 B2 | 7/2016 | Grace et al. | |
| 9,459,350 B2 | 10/2016 | Betts et al. | |
| 9,505,477 B2 | 11/2016 | Grace et al. | |
| 9,676,462 B2 | 6/2017 | Bernloehr et al. | |
| 9,746,874 B2 | 8/2017 | Johnson et al. | |
| 9,758,222 B2 | 9/2017 | Grace et al. | |
| 2003/0191562 A1 | 10/2003 | Robertson et al. | |
| 2003/0203684 A1 | 10/2003 | Healey | |
| 2003/0214483 A1 | 11/2003 | Hammer et al. | |
| 2005/0255761 A1 | 11/2005 | Bernloehr et al. | |
| 2006/0116031 A1 | 6/2006 | Bernloehr et al. | |
| 2009/0037040 A1 | 2/2009 | Salmon et al. | |
| 2009/0227158 A1 | 9/2009 | Bernloehr et al. | |
| 2012/0014220 A1 | 1/2012 | DePasqua | |
| 2012/0015566 A1 | 1/2012 | Salmon | |
| 2012/0060733 A1 | 3/2012 | Maki et al. | |
| 2012/0204467 A1 | 8/2012 | Palmer et al. | |
| 2012/0232719 A1 | 9/2012 | Salmon et al. | |
| 2013/0044569 A1 | 2/2013 | DePasqua | |
| 2013/0215719 A1 | 8/2013 | Betts et al. | |
| 2014/0203162 A1 | 7/2014 | Logan | |
| 2014/0249698 A1 | 9/2014 | Salmon et al. | |
| 2014/0269164 A1 | 9/2014 | Betts et al. | |
| 2014/0277851 A1 | 9/2014 | Grace et al. | |
| 2014/0336854 A1 | 11/2014 | Salmon et al. | |
| 2015/0016130 A1 | 1/2015 | Davis et al. | |
| 2015/0063059 A1 | 3/2015 | DePasqua | |
| 2015/0063060 A1 | 3/2015 | DePasqua | |
| 2015/0151824 A1 | 6/2015 | Wireman | |
| 2015/0346729 A1 | 12/2015 | Grace et al. | |
| 2016/0016651 A1 | 1/2016 | Anderson et al. | |
| 2018/0244361 A1 | 8/2018 | Laster | |
| 2019/0176952 A1 | 6/2019 | Clark et al. | |

FOREIGN PATENT DOCUMENTS

| | | |
|---|---|---|
| WO | WO 2013/126761 A1 | 8/2013 |
| WO | WO 2014/144471 A1 | 9/2014 |

OTHER PUBLICATIONS

Motor Guide Xi5 Wireless Foot Pedal [retrieved Dec. 7, 2017] <http://www.motorguide.com/store/accessory/xi5-wireless-foot-pedal0>.

Bass Resource the Ultimate Bass Fishing Resource Guide: Bass Fishing Forums "Trolling Motor Foot Pedal—Do You Mount to Deck?" [retrieved Dec. 8, 2017] <https://www.bassresource.com/bass-fishing-forums/topic/190825-trolling-motor-foot-pedal-do-you-mount-to-deck/>.

* cited by examiner

FOOT PEDAL FOR A TROLLING MOTOR ASSEMBLY

CROSS REFERENCE TO RELATED APPLICATIONS

This application claims priority to and is a divisional of U.S. non-provisional patent application Ser. No. 15/835,752, entitled "Foot Pedal for a Trolling Motor Assembly," filed Dec. 8, 2017, which is incorporated by reference herein in its entirety.

FIELD OF THE INVENTION

Embodiments of the present invention relate generally to trolling motor assemblies and, more particularly, to systems, assemblies, and associated methods for providing remote operation of a trolling motor assembly.

BACKGROUND OF THE INVENTION

Trolling motors are often used during fishing or other marine activities. The trolling motors attach to the watercraft and propel the watercraft along a body of water. For example, trolling motors may provide secondary propulsion or precision maneuvering that can be ideal for fishing activities. The trolling motors, however, may also be utilized for the main propulsion system of watercraft. Accordingly, trolling motors offer benefits in the areas of ease of use and watercraft maneuverability, among other things. That said, further innovation with respect to the operation of trolling motors is desirable. Applicant has developed systems, assemblies, and methods detailed herein to improve capabilities of trolling motors.

BRIEF SUMMARY OF THE INVENTION

Depending on the desired activity, an operator or user of the watercraft with the trolling motor may wish to remotely operate the trolling motor (e.g., not have to be positioned directly adjacent the trolling motor and/or have "hands free" control thereof). In this regard, the user may want to utilize a user input assembly such as, but not limited to, a foot pedal.

Existing foot pedal assemblies for controlling the operation of trolling motors typically have a "momentary button" disposed thereon that allows for intermittent operation of the trolling motor by depressing the button with the user's foot. As well, known foot pedal assemblies may include a graduated "speed wheel" that allows a user to vary the speed of the motor's propeller when the pedal is operated. However, in existing foot pedal assemblies, both the momentary button and the speed wheel have fixed positions on either the left of right side of the assembly, which may not be the user's preferred side. Moreover, existing assemblies do not allow the speed of the trolling motor to be varied using only the momentary button. Specifically, known momentary buttons function as ON/OFF switches, with any variation in speed requiring a user to operate the speed wheel. Known foot pedal assemblies are also either fixed to the deck of the corresponding watercraft or left loose in cases where the trolling motor is secured to the watercraft with a quick release assembly. Thus, embodiments of the present invention seek to provide foot pedal assemblies that allow for the position of the momentary button and speed wheel to be selected by the user, variable speed operation of the trolling motor via the momentary button, and/or both quickly securing and releasing the foot pedal assemblies from the corresponding watercraft.

An example embodiment of the present invention provides a user input assembly for controlling operation of a trolling motor assembly having a propulsion motor. The user input assembly comprises a support plate, an input device housing pivotably mounted to the support plate, wherein the input device housing defines a top surface that is configured to receive a user's foot thereon, and the top surface defines a left edge and right edge. A switch is selectively secured to the input device housing in one of a first position and a second position, the first position is proximate the left edge of the top surface of the input device housing, and the second position is proximate the right edge of the top surface of the input device housing. The switch is movable between an open position and a closed position, and the switch is biased to one of the open position and the closed position. Power is supplied to the propulsion motor when the switch is moved from one of the biased open position to the closed position and the biased closed position to the open position.

In some embodiments, the user input assembly further comprises a mounting structure, and the switch is secured to the mounting structure. The mounting structure is removably secured to the top surface of the input device housing, and the mounting structure is rotatable with respect to the input device housing so that the switch is movable from the first position to the second position.

In some embodiments, the user input assembly further comprises a speed wheel, wherein the speed wheel is rotatably secured to the mounting structure, and the speed wheel is rotatable over a range of operating speeds of the propulsion motor.

In some embodiments, the user input assembly further comprises a mounting structure, wherein the mounting structure is removably secured to the top surface of the input device housing. The mounting structure defines a first aperture that is configured to removably receive the switch.

In some embodiments, the mounting plate further defines a second aperture configured to removably receive the switch and the switch is positionable in either of the first aperture and the second aperture.

In some embodiments, the switch further comprises a pressure sensor that is configured to detect an amount of force applied to the switch by a user. The amount of force applied to the switch is related to a desired operating speed of the propulsion motor.

In some embodiments, the user input device is a foot pedal assembly and the pressure sensor further comprises a depressable button.

Another example of the present invention provides trolling motor system comprising a trolling motor assembly with a propulsion motor and a propeller, wherein the propulsion motor is variable speed and configured to rotate the propeller at a desired speed in response to an electrical signal. A navigation control device comprises a user input assembly defining a top surface that is configured to receive a user's foot thereon, wherein the top surface defines a left edge and a right edge. The user input assembly further includes a switch that is selectively secured to the user input assembly in one of a first position and a second position, and the first position is proximate the left edge of the top surface of the user input assembly, and the second position is proximate the right edge of the top surface of the user input assembly. The switch is movable between an open position and a closed position, the switch is biased to one of the open position and the closed position, and power is supplied to the propulsion motor when the switch is moved from one of the biased open position to the closed position and the biased closed position to the open position. The switch is configured to detect user activity related to controlling the speed of the propulsion motor. The trolling motor system further comprises a processor configured to determine the desired speed based on user activity detected by the switch of the user input assembly, generate a speed input signal, the speed input signal being an electrical signal indicating the desired speed, direct the propulsion motor, via the speed input signal, to rotate the propeller via the propulsion motor at the desired speed based on the speed indicated in the speed input signal.

In some embodiments, the user input assembly further comprises a support plate, an input device housing pivotably mounted to the support plate, and a mounting structure, wherein the switch is secured to the mounting structure and the mounting structure is removably secured to a top surface of the input device housing. The mounting structure is rotatable with respect to the input device housing so that the switch is movable from the first position to the second position.

In some embodiments, the user input assembly further comprises a speed wheel, and the speed wheel is rotatably secured to the mounting plate. The speed wheel is rotatable over a range of operating speeds of the propulsion motor.

In some embodiments, the trolling motor system further comprises a mounting structure, and the mounting structure is removably secured to the top surface of the user input assembly, and the mounting structure defines a first aperture that is configured to removably receive the switch.

In some embodiments, the mounting plate further defines a second aperture configured to removably receive the switch and the switch is positionable in either of the first aperture and the second aperture.

In some embodiments, the user input assembly is a foot pedal assembly and the switch further comprises a pressure sensor. The pressure sensor is configured to detect an amount of force applied to the pressure sensor by a user and provide a force value based on the detected amount of force, and the processor is further configured to determine the desired speed based on the force value.

Yet another example embodiment of the present invention provide a foot pedal assembly for controlling operation of a trolling motor assembly that is secured to a corresponding watercraft. The foot pedal assembly comprises a foot pedal including a top surface that is configured to receive a foot of a user, a base plate that is configured to be affixed to the watercraft, and at least one locking element configured to releasably attach the foot pedal to the base plate.

In some embodiments, at least one locking element comprises a plurality of locking elements, and each locking element includes a projection and a corresponding aperture for releasably receiving the corresponding projection. Each projection is secured to the foot pedal and each corresponding aperture is disposed in a fixed position on the watercraft. Each projection is releasably received by the corresponding aperture so that the foot pedal is secured to the watercraft, and each projection is configured to be selectively removed from the corresponding aperture by the user without a tool.

In some embodiments, each projection further comprises a latch that depends downwardly from a bottom surface of the foot pedal, and each latch includes a lever that is configured to allow the user to rotate the corresponding latch between a lock position in which the latch both extends into and is secured within the corresponding aperture, thereby securing the foot pedal to the watercraft, and a release position in which the user may remove the corresponding latch from the corresponding aperture.

In some embodiments, the trolling motor system further comprises a foot pedal mounting plate defining a plurality of apertures, each latch is rotatably received in a corresponding aperture of the foot pedal mounting plate. The foot pedal is affixed to the foot pedal mounting plate.

In some embodiments, the base plate is affixed to the watercraft with a first plurality of fasteners, and the foot pedal is affixed to the foot pedal mounting plate with a second plurality of fasteners.

In some embodiments, the plurality of locking elements comprises one of cam locks, spring locks and snap locks.

Another example embodiment of the present invention provides a trolling motor system comprising a trolling motor assembly with a propulsion motor and a propeller, wherein the propulsion motor is variable speed and configured to rotate the propeller at a desired speed in response to an electrical signal. A navigation control device comprises a user input assembly defining a top surface that is configured to receive a user's foot thereon, and the user input assembly includes a switch that is movable between an open position and a closed position. The switch is biased to one of the open position and the closed position, and power is supplied to the propulsion motor when the switch is moved from one of the biased open position to the closed position and the biased closed position to the open position. The switch is configured to detect user activity related to controlling the speed of the propulsion motor. The trolling motor system further comprises a processor configured to determine the desired speed based on user activity detected by the switch of the user input assembly, generate a speed input signal, the speed input signal being an electrical signal indicating the desired speed, and direct the propulsion motor, via the speed input signal, to rotate the propeller via the propulsion motor at the desired speed based on the speed indicated in the speed input signal.

In some embodiments, the user input assembly is a foot pedal assembly and the switch further comprises a pressure sensor. The pressure sensor is configured to detect an amount of force applied to the pressure sensor by the user and provide a force value based on the detected amount of force, and the processor is further configured to determine the desired speed based on the force value.

In some embodiments, the foot pedal assembly further comprises one of a speed wheel and a linear input device. The speed wheel is rotatable over a range of operating speeds of the propulsion motor and the linear input device is slidable over a range of operating speeds of the propulsion motor.

In some embodiments, the foot pedal assembly further comprises a foot pedal housing, a support plate, the foot pedal housing being pivotably mounted to the support plate, and a mounting structure, wherein the pressure sensor is secured to the mounting structure and the mounting structure is removably secured to a top surface of the foot pedal housing. The mounting structure is rotatable with respect to the foot pedal housing so that the pressure sensor is movable from a first position to a second position with respect to the foot pedal housing.

BRIEF DESCRIPTION OF THE DRAWINGS

Figure 1:
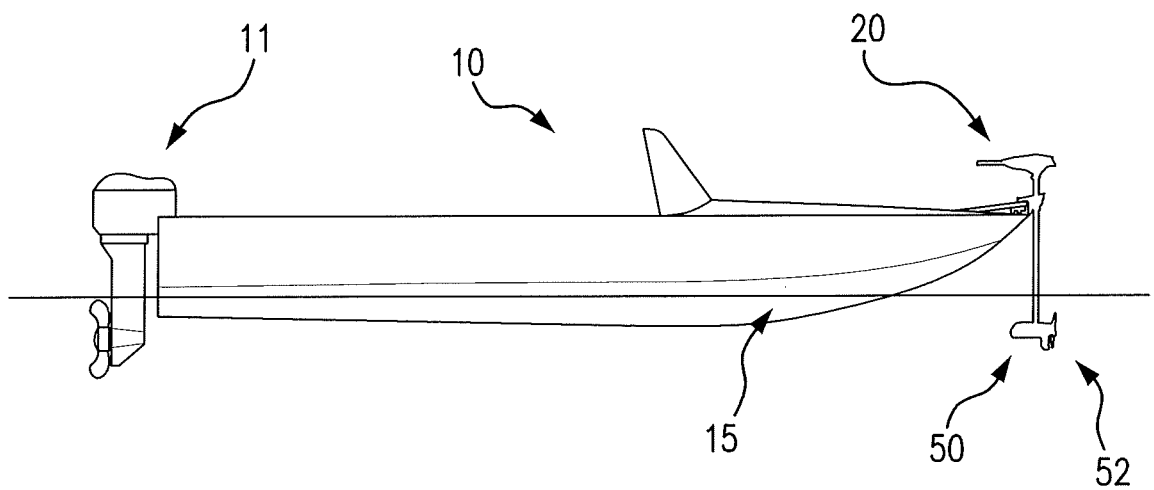
Figure 2:
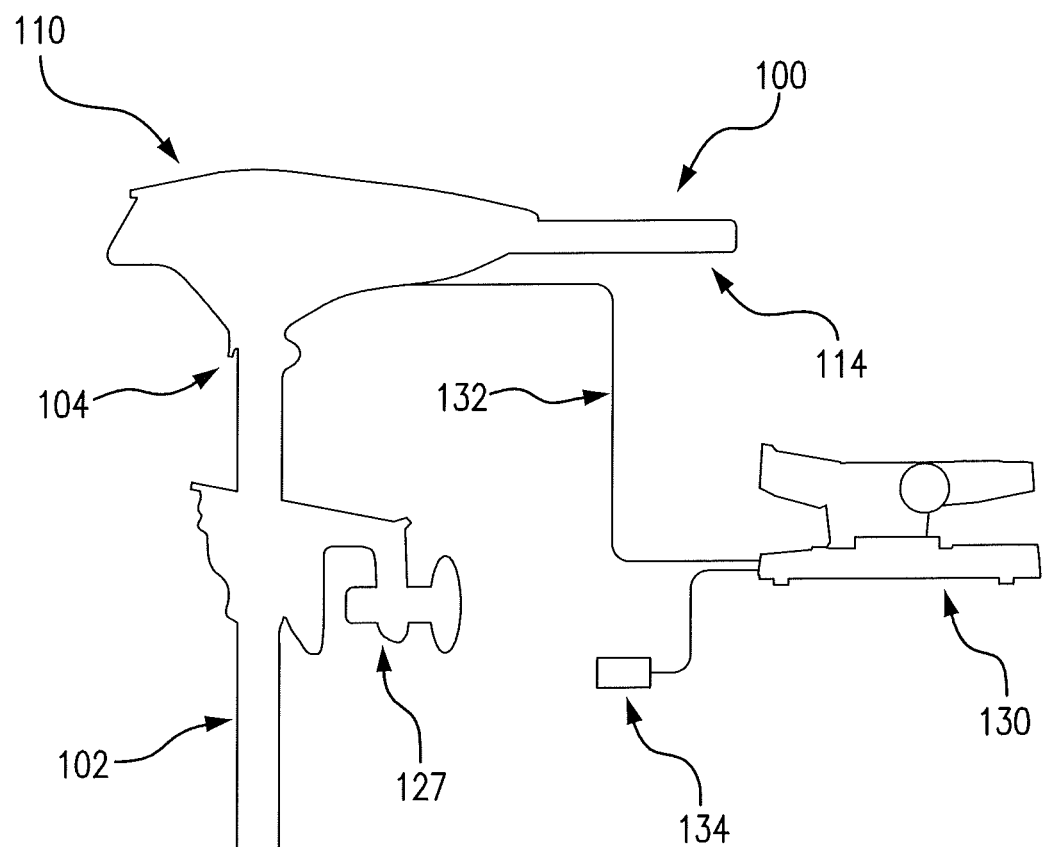
Figure 2:
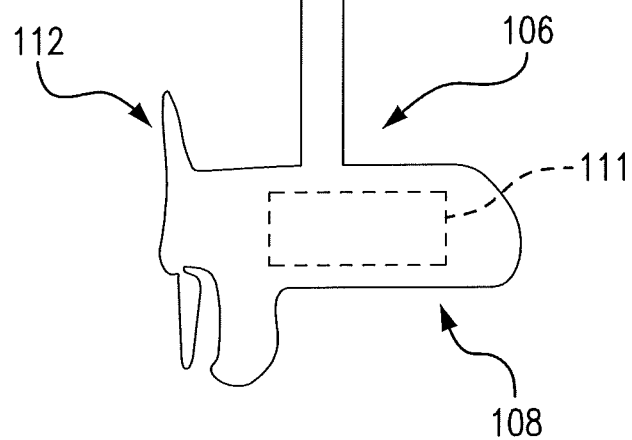
Figure 3:
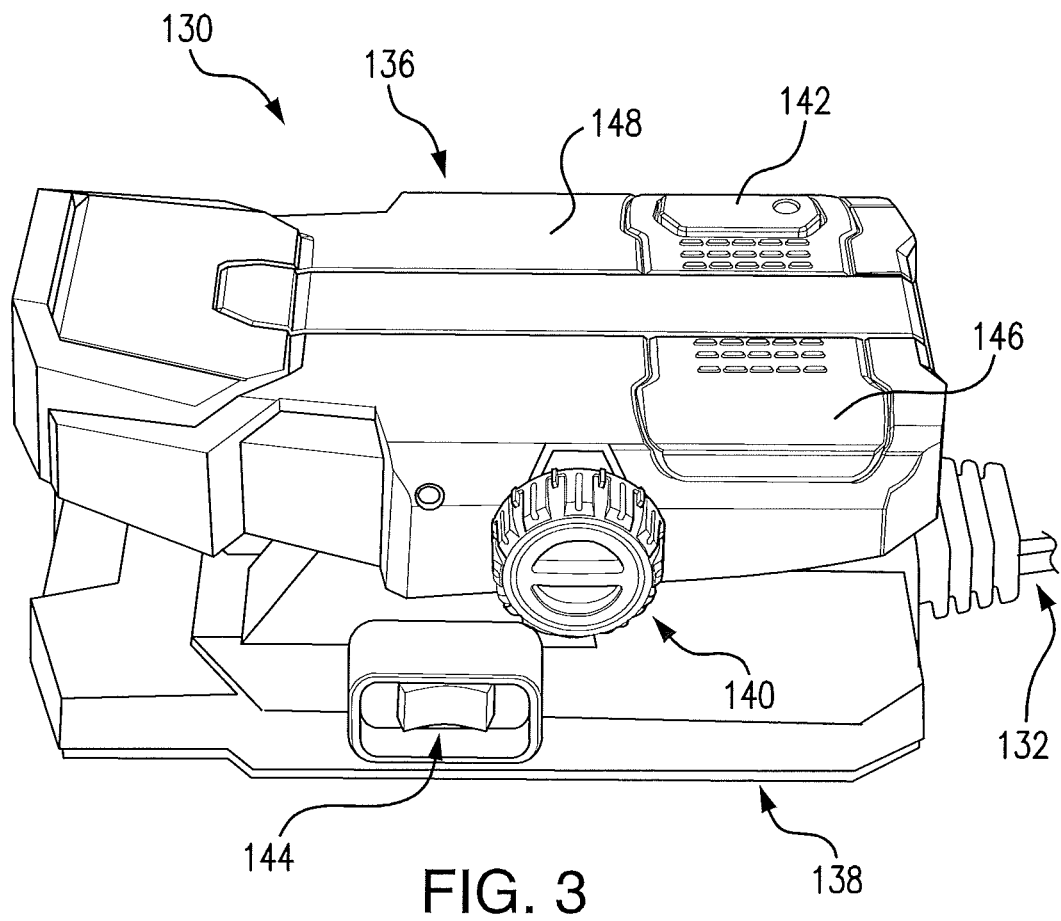
Figure 4:
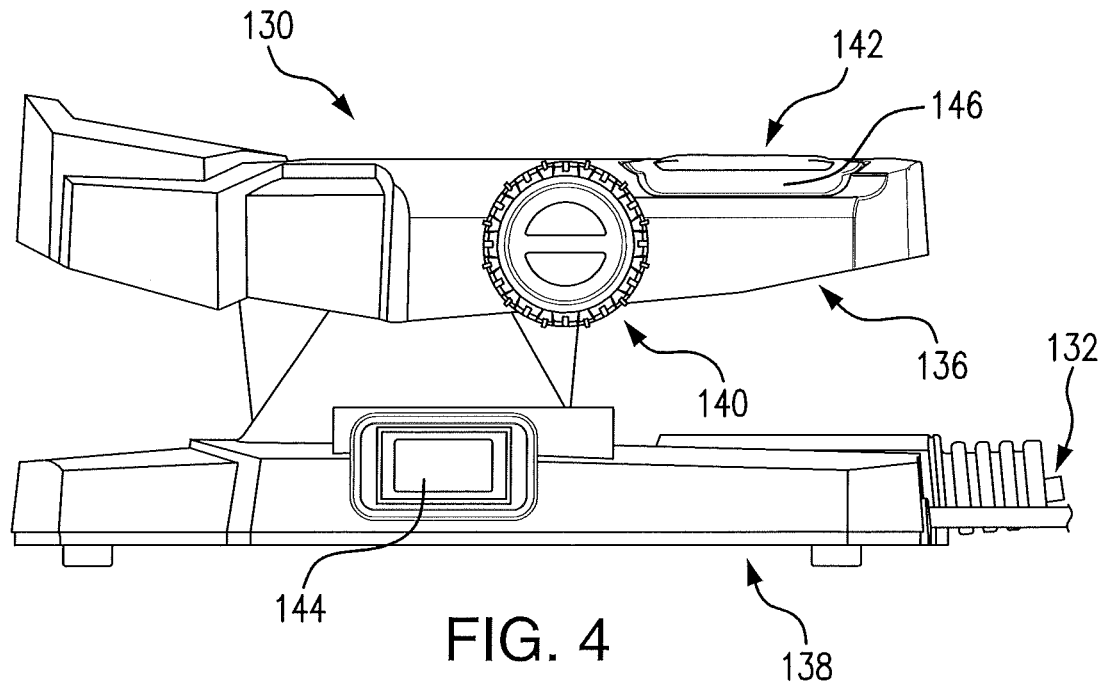
Figure 5:
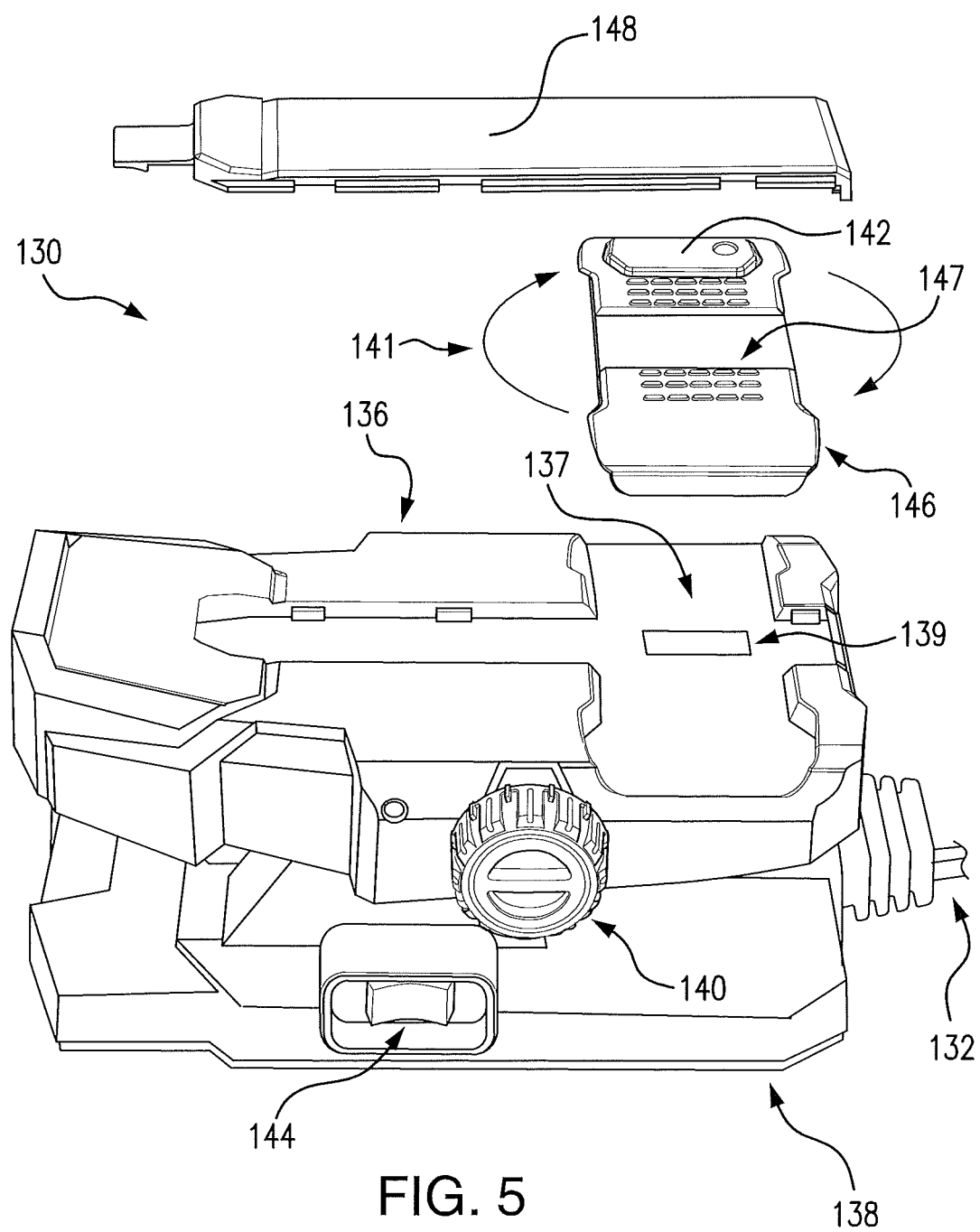
Figure 6:
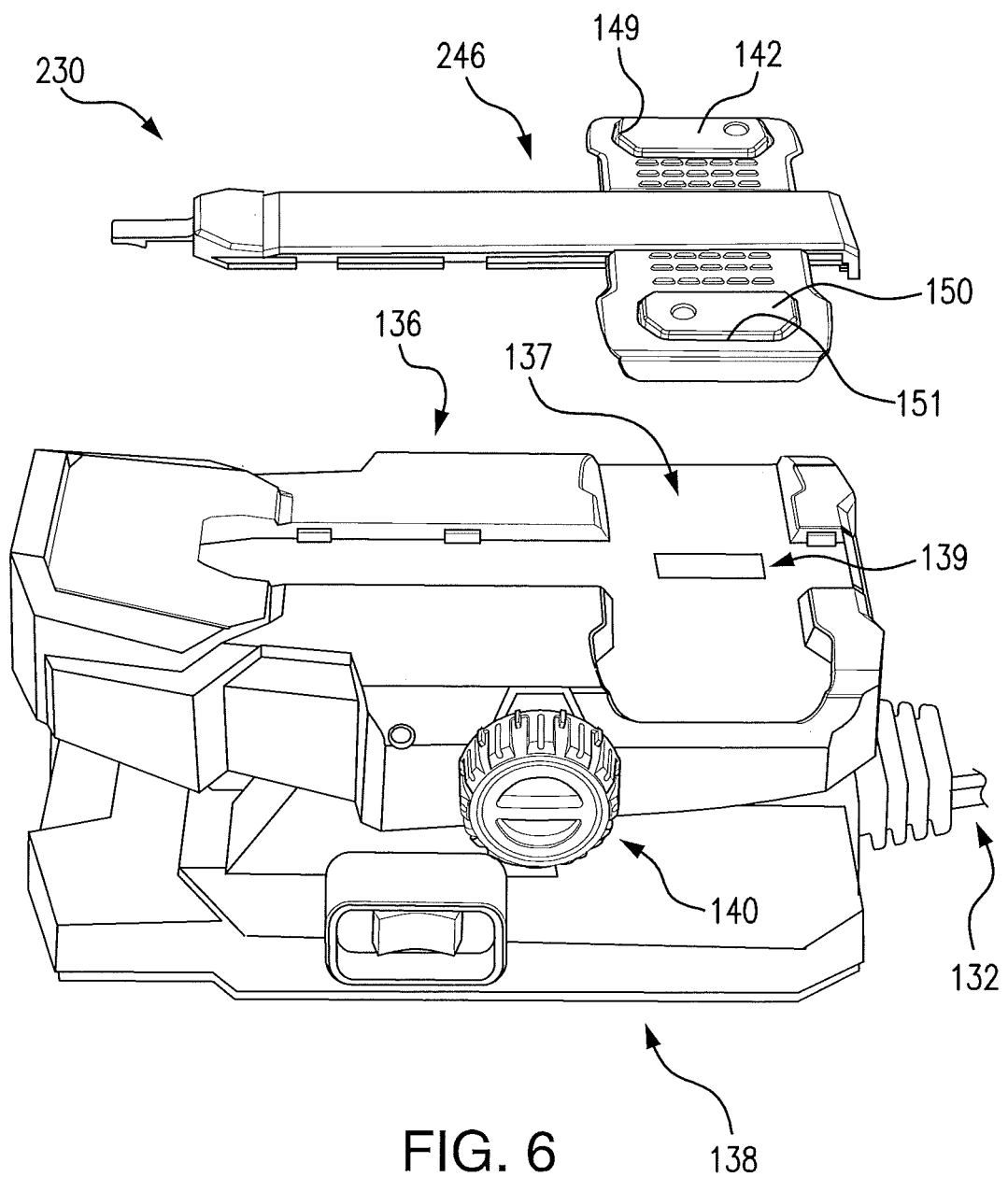
Figure 7:
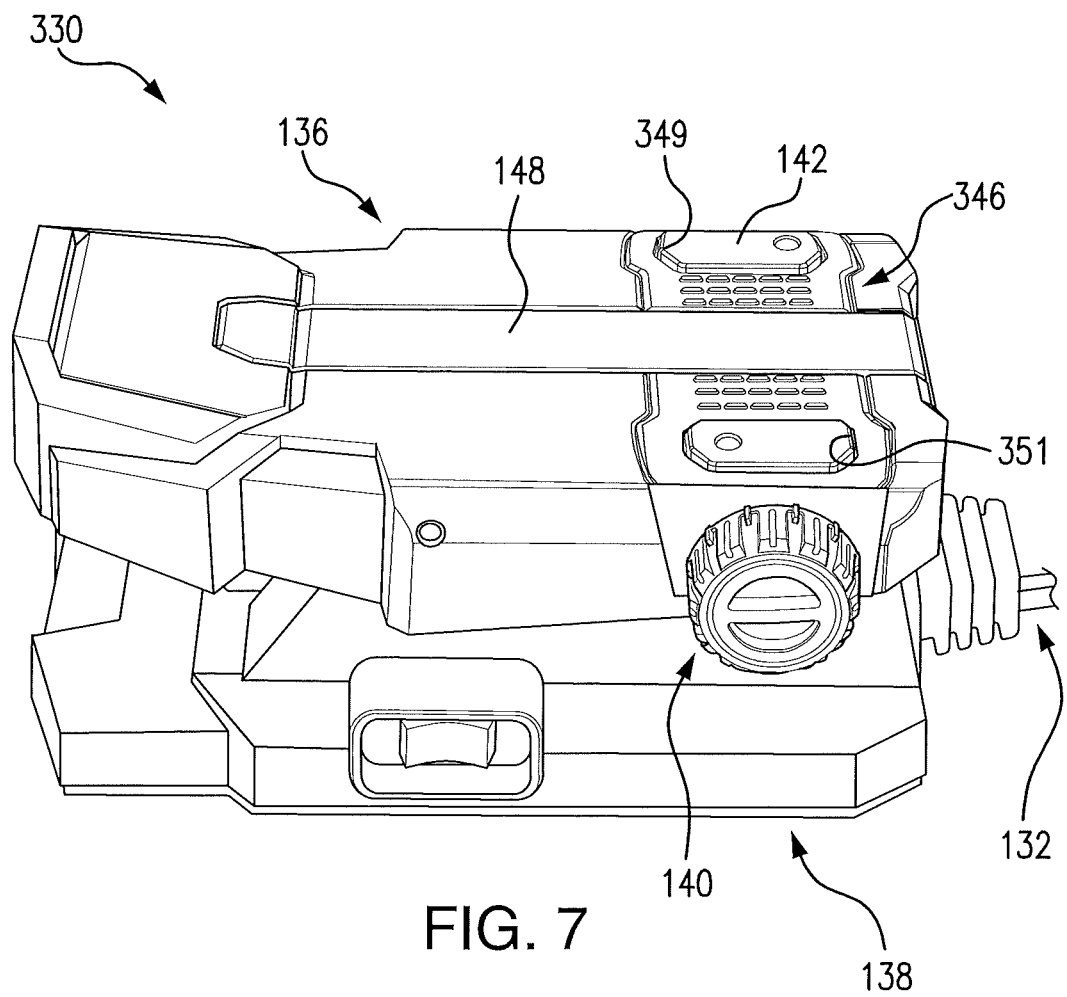
Figure 8:
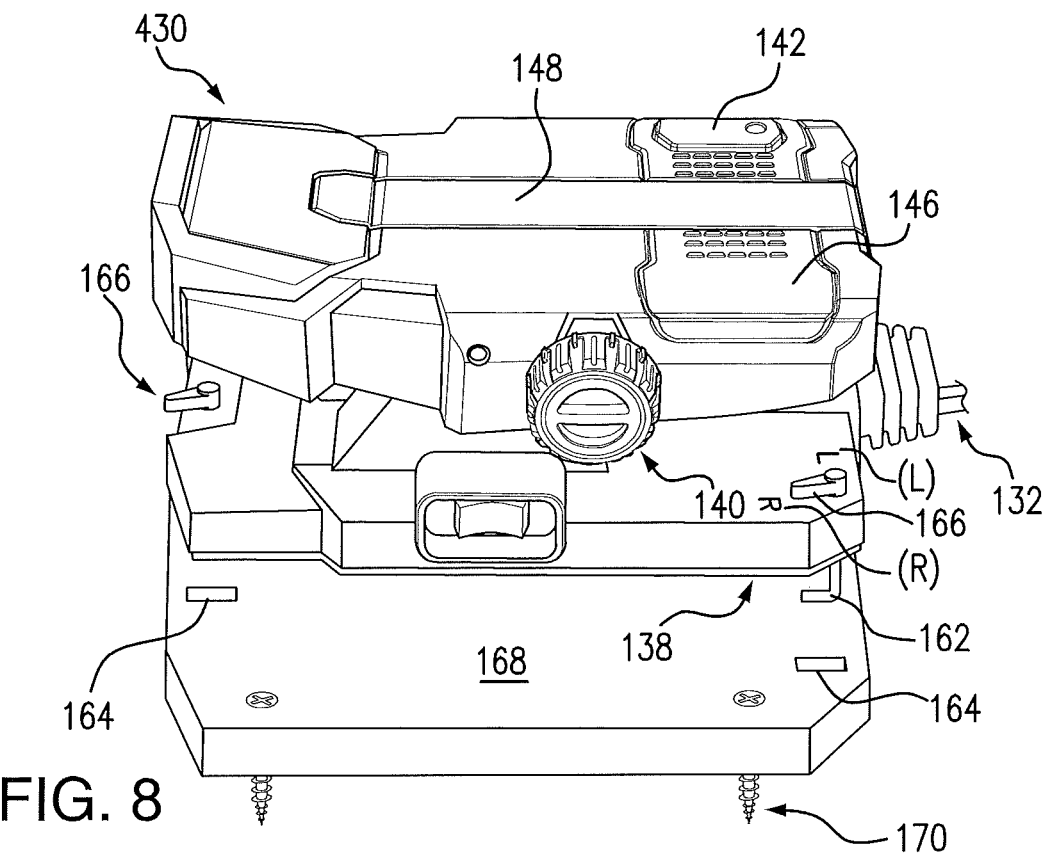
Figure 9:
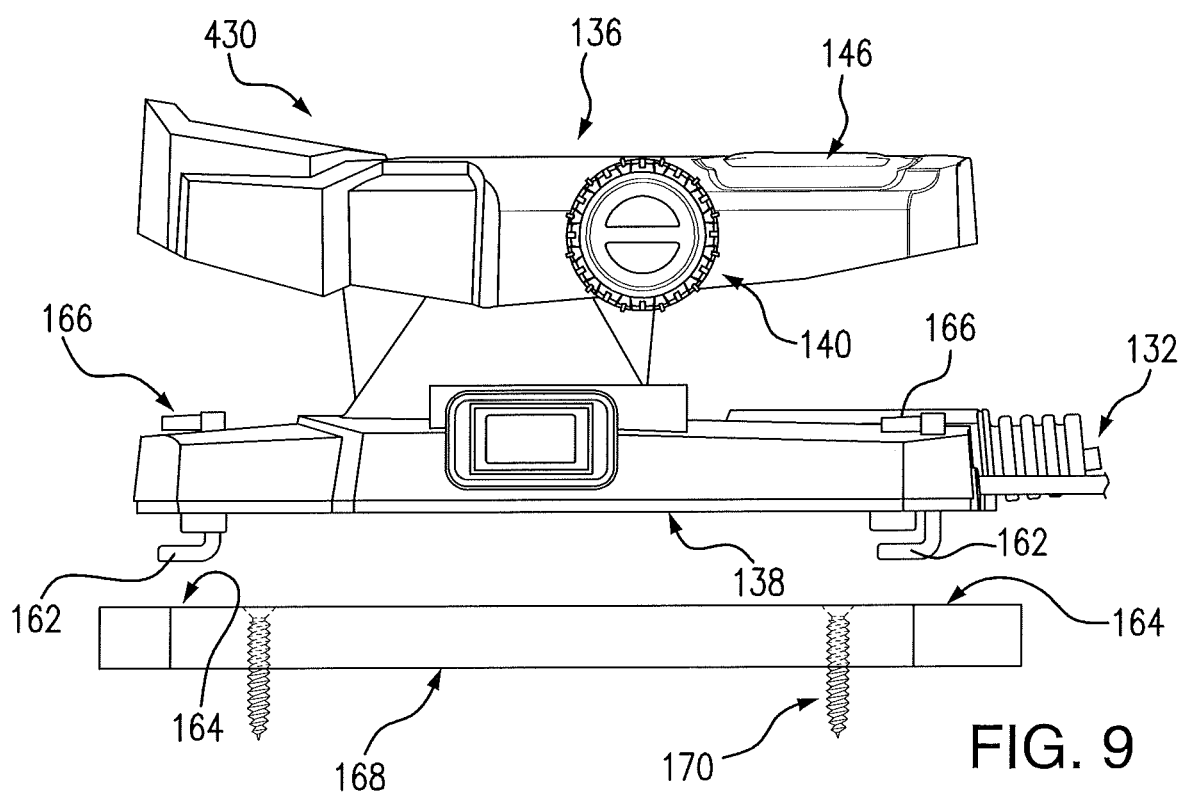
Figure 10:
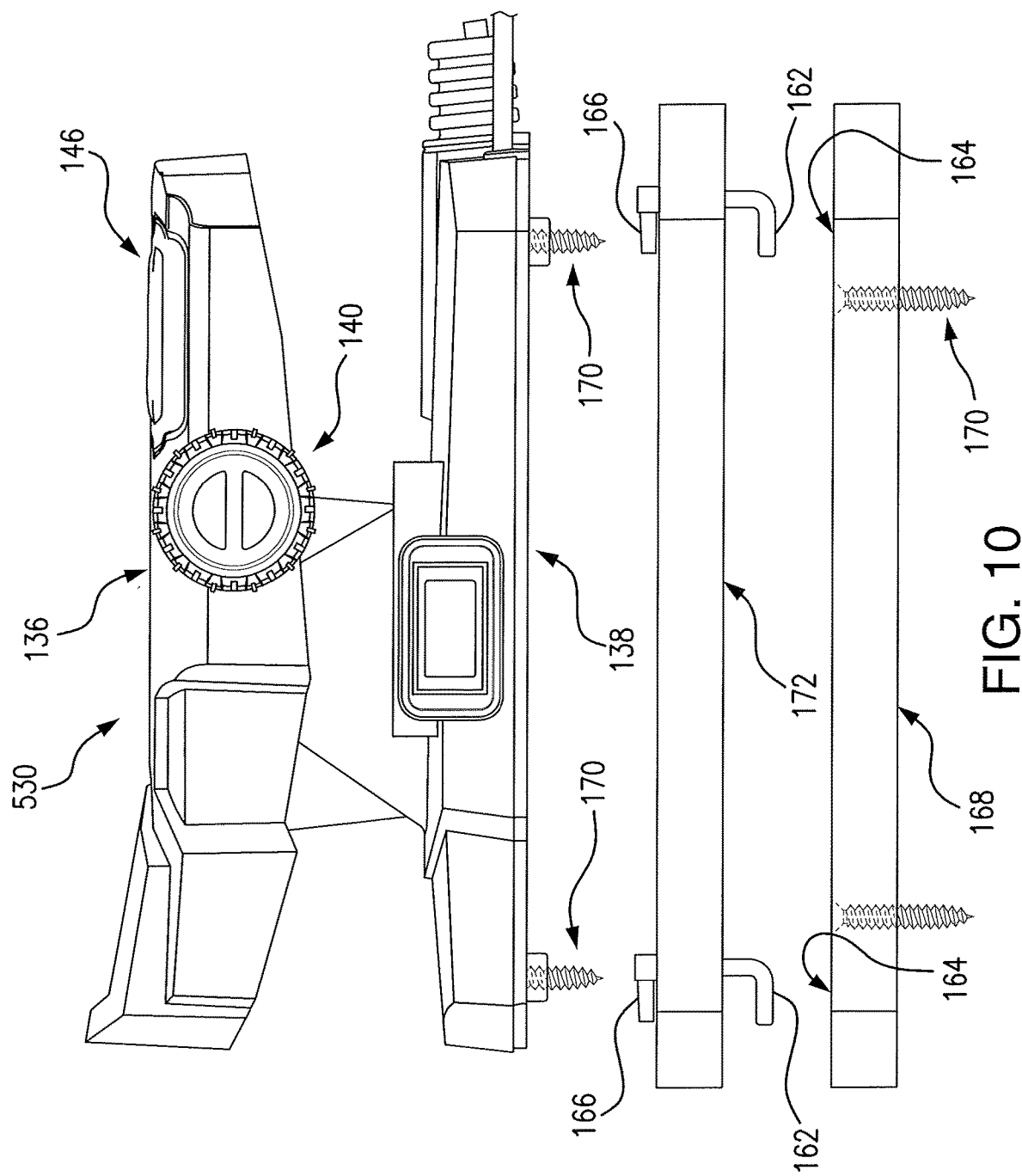
Figure 11:
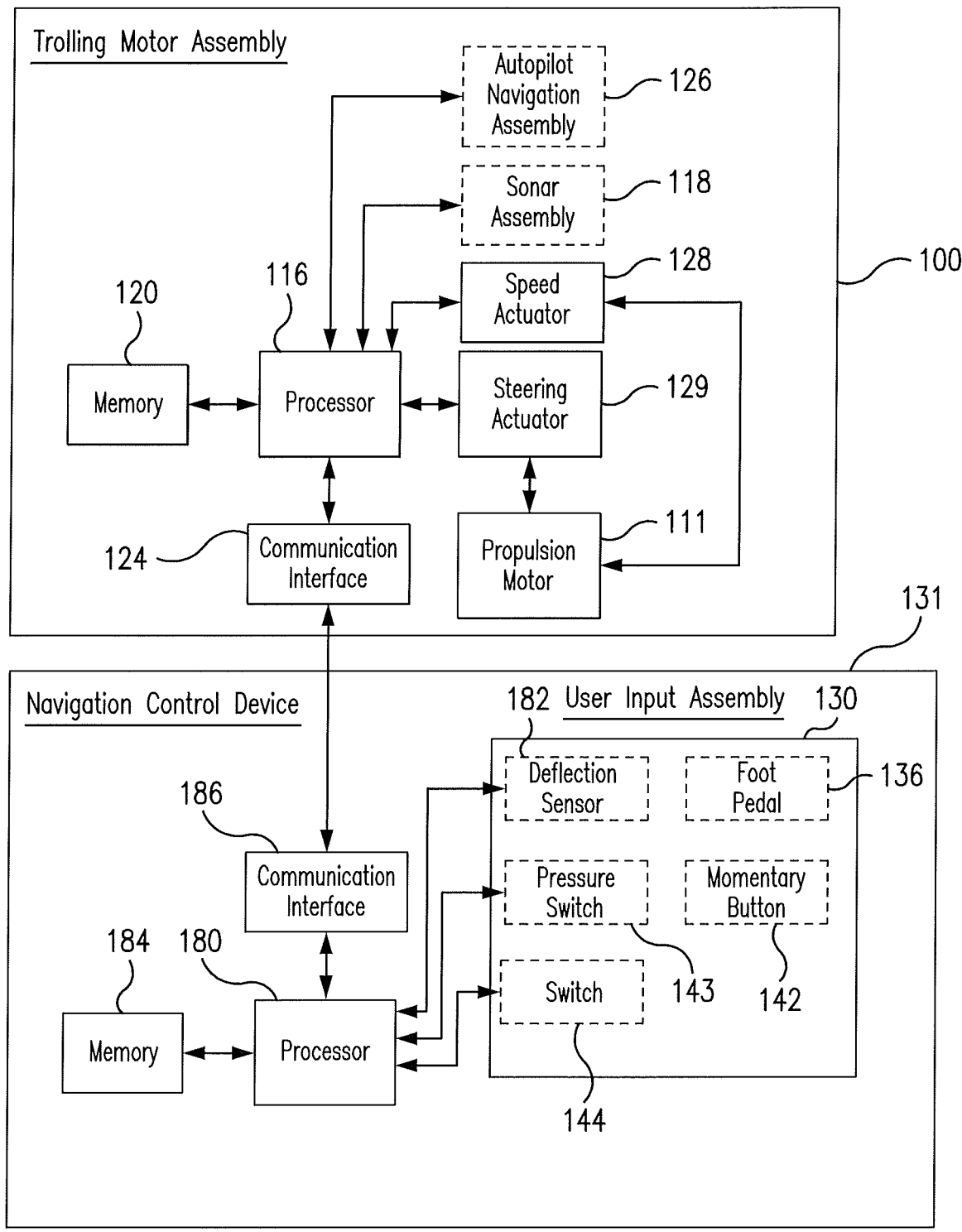
Figure 12:
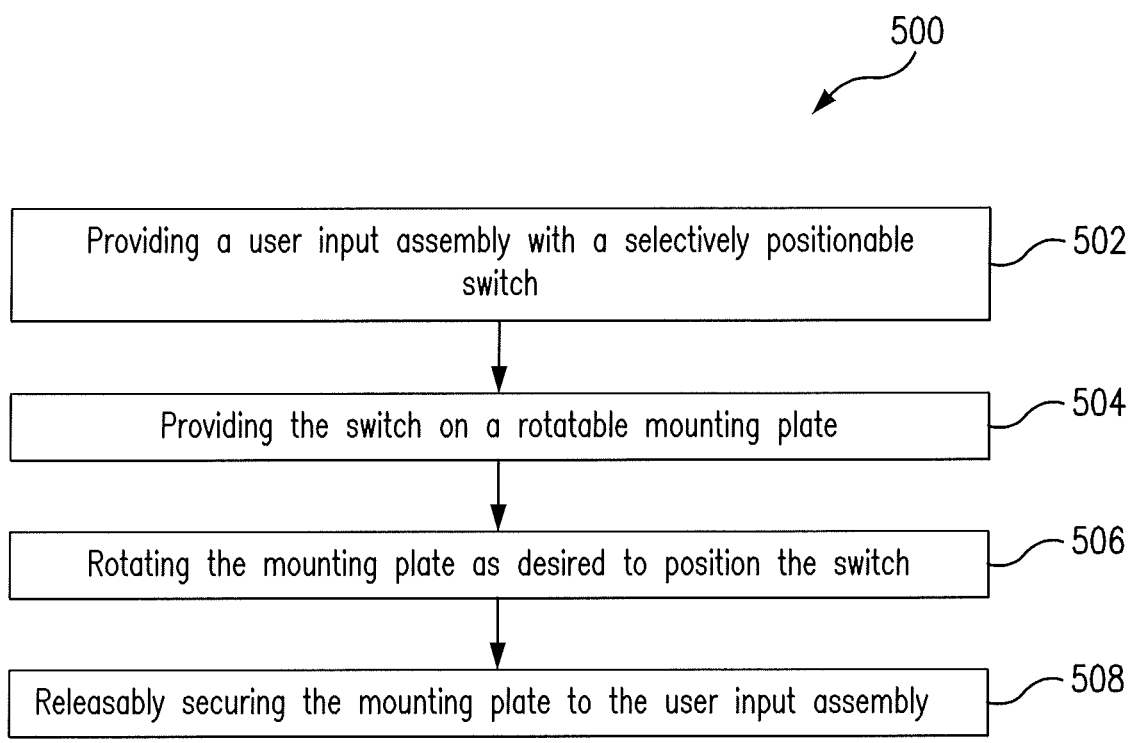
Figure 13:
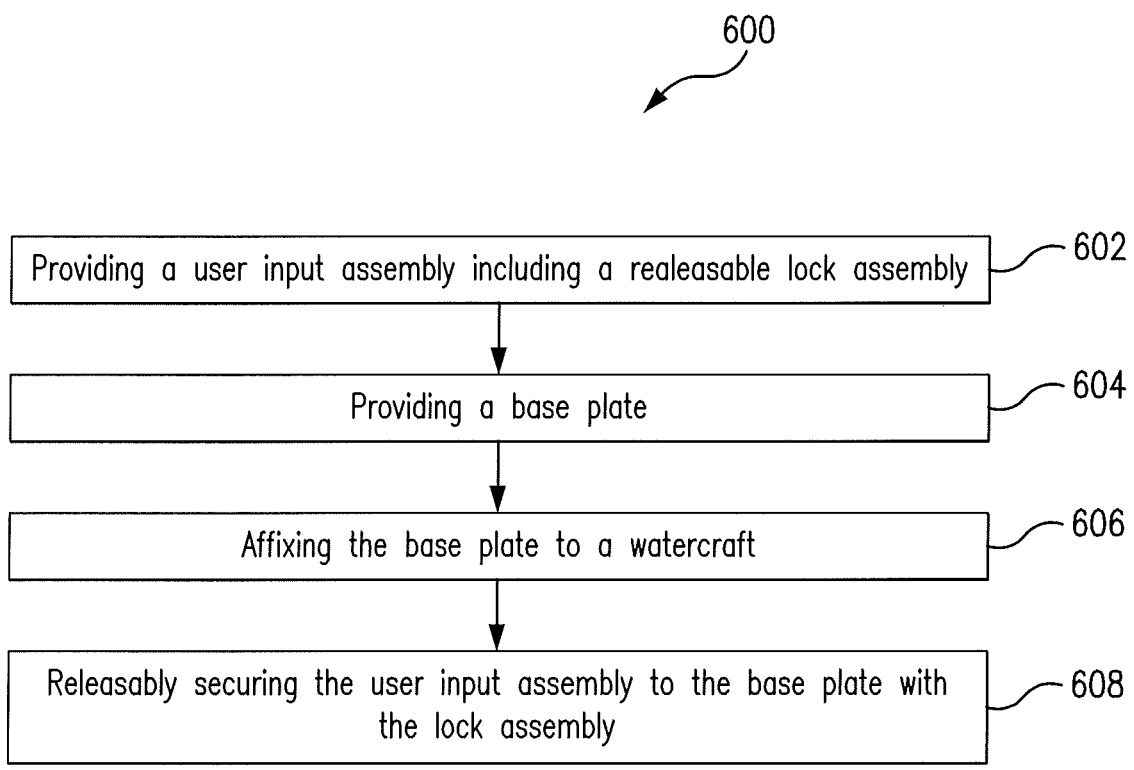
Figure 14:
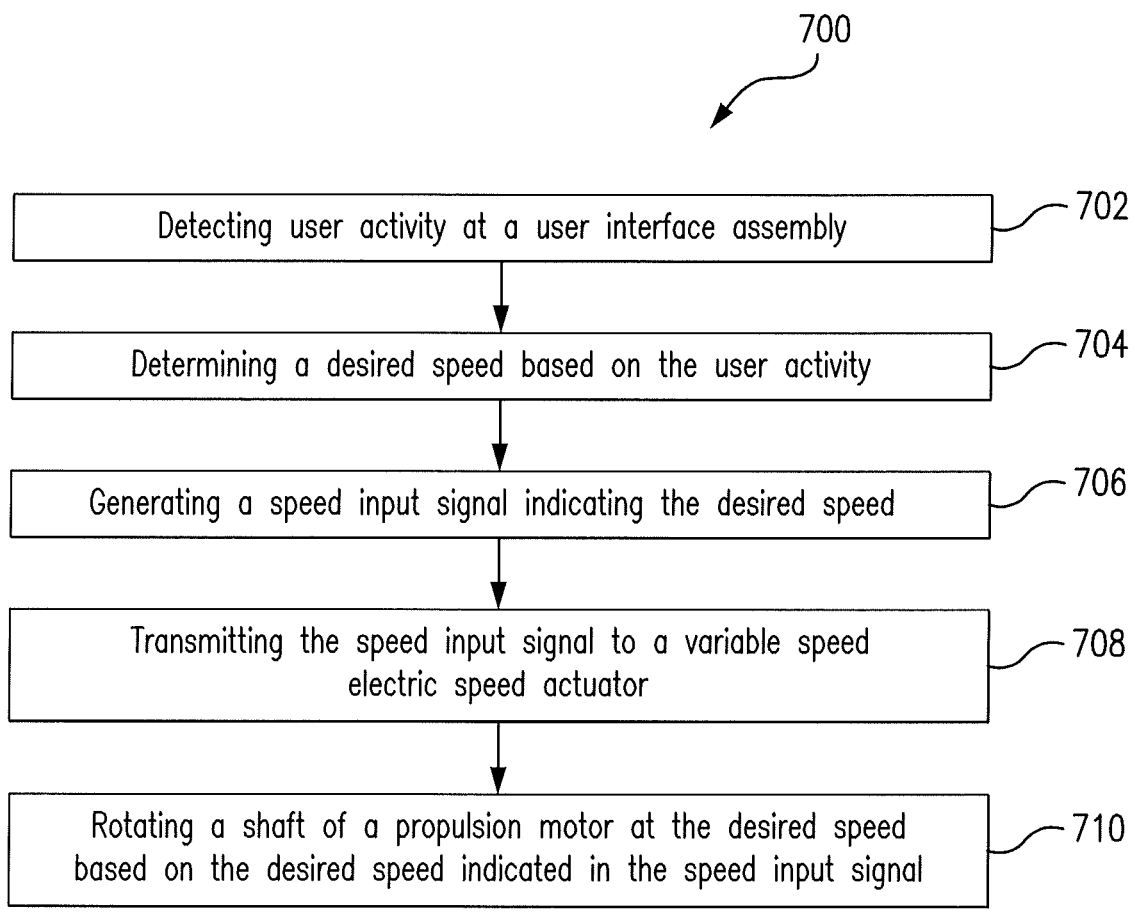

Having thus described the invention in general terms, reference will now be made to the accompanying drawings, which are not necessarily drawn to scale, and wherein:

FIG. 1 illustrates an example trolling motor assembly attached to a front of a watercraft, in accordance with some embodiments discussed herein;

FIG. 2 shows an example trolling motor assembly configured for control by either a foot pedal or by hand, in accordance with some embodiments discussed herein;

FIG. 3 shows a perspective view of an example foot pedal assembly for a trolling motor assembly, in accordance with some embodiments discussed herein;

FIG. 4 shows a side view of the example foot pedal assembly shown on FIG. 3;

FIG. 5 shows an exploded, perspective view of the example foot pedal assembly shown in FIGS. 3 and 4;

FIG. 6 shows an exploded, perspective view of an alternate example foot pedal assembly for a trolling motor assembly, in accordance with some embodiments discussed herein;

FIG. 7 shows a perspective view of an alternate example foot pedal assembly for a trolling motor assembly, in accordance with some embodiments discussed herein;

FIG. 8 shows a perspective view of an alternate example foot pedal assembly for a trolling motor assembly, wherein the foot pedal assembly is selectively removable from a base plate, in accordance with some embodiments discussed herein;

FIG. 9 shows a side view of the example foot pedal assembly shown in FIG. 8;

FIG. 10 shows a side view of an alternate example foot pedal assembly for a trolling motor assembly, in accordance with some embodiments discussed herein;

FIG. 11 shows a block diagram illustrating an example system of a trolling motor assembly and a navigation control device, in accordance with some embodiments discussed herein; and FIG. 12 shows a flowchart of an example method for positioning a sensor on a user input assembly for a trolling motor, in accordance with some example embodiments;

FIG. 13 shows a flowchart of an example method for releasably securing a user input device on a watercraft, in accordance with some example embodiments; and FIG. 14 illustrates a flowchart of an example method for controlling operation of a trolling motor in accordance with some example embodiments.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein. Rather, these embodiments are provided so that this disclosure will satisfy applicable legal requirements. Like reference numerals refer to like elements throughout.

FIG. 1 illustrates an example watercraft 10 on a body of water 15. The watercraft 10 has a trolling motor assembly 20 attached to its front, with a trolling motor 50 submerged in the body of water. According to some example embodiments, the trolling motor assembly 20 may include a propulsion motor 50 and a propeller 52, and a navigation control device used to control the speed and the course or direction of propulsion. The trolling motor assembly 20 may be attached to the bow of the watercraft 10 and the propulsion motor 50 and propeller 52 may be submerged in the body of water. However, positioning of the trolling motor assembly 20 need not be limited to the bow, and may be placed elsewhere on the watercraft 10. The trolling motor assembly 20 can be used to propel the watercraft 10 under certain circumstances, such as, when fishing and/or when wanting to remain in a particular location despite the effects of wind and currents on the watercraft 10. Depending on the design, the propeller 52 of a trolling motor assembly may be driven by a gas-powered engine or an electric motor. Moreover, steering the trolling motor assembly 20 may be accomplished manually via hand control on via foot control. While FIG. 1 depicts the trolling motor assembly 20 as being a secondary propulsion system to the main engine 11, example embodiments described herein contemplate that the trolling motor assembly 20 may be the primary propulsion system for the watercraft 10.

FIG. 2 illustrates an example trolling motor assembly 100 that is electric and preferably controlled with a foot pedal assembly 130 (e.g., trolling motor assembly in FIG. 11). The trolling motor assembly 100 includes a shaft 102 defining a first end 104 and a second end 106, a trolling motor housing 108 and a main housing 110. The trolling motor housing 108 is attached to the second end 106 of the shaft 102 and at least partially contains a propulsion motor 111, or trolling motor, that connects to a propeller 112. As shown in FIG. 1, in some embodiments, when the trolling motor assembly is attached to the watercraft 10 and the propulsion motor 111 (or trolling motor housing) is submerged in the water, the propulsion motor is configured to propel the watercraft to travel along the body of water. In addition to containing the propulsion motor 111, the trolling motor housing 108 may include other components such as, for example, a sonar transducer assembly and/or other sensors or features (e.g., lights, temperature sensors, etc.).

The main housing 110 is connected to the shaft 102 proximate the first end 104 of the shaft 102 and includes a hand control rod 114 that enables control of the propulsion motor 111 by a user (e.g., through angular rotation) although the foot pedal assembly 130 is the preferred method of controlling the operation of the trolling motor assembly 100. As shown in FIG. 1, in some embodiments, when the trolling motor assembly is attached to the watercraft and the propulsion motor 111 is submerged in the water, the main housing 110 is positioned out of the body of water and visible/accessible by a user. The main housing 110 may be configured to house components of the trolling motor assembly, such as may be used for processing marine data and/or controlling operation of the trolling motor, among other things. For example, with reference to FIG. 11, depending on the configuration and features of the trolling motor assembly, the trolling motor assembly 100 may contain, for example, one or more of a processor 116, sonar assembly 118, memory 120, communication interface 124, an autopilot navigation assembly 126, a speed actuator 128, and a steering actuator 129 for the propulsion motor 111.

As noted, in some embodiments, the trolling motor assembly 100 includes a foot pedal assembly 130 that is electrically connected to the propulsion motor 111 (such as through the main housing 110) using a cable 132. Referring also to FIG. 11, the foot pedal assembly 130 may enable a user to steer and/or otherwise operate the trolling motor assembly 100 to control the direction and speed of travel of the watercraft. Further, depending on the configuration of the foot pedal assembly, the foot pedal assembly 130 may include an electrical plug 134 that can be connected to an external power source.

The trolling motor assembly 100 may also include an attachment device 127 to enable connection or attachment of the trolling motor assembly 100 to the watercraft. Depending on the attachment device used, the trolling motor assembly 100 may be configured for rotational movement relative to the watercraft, including, for example, 360 degree rotational movement.

As detailed herein, embodiments of the present invention provide a foot pedal assembly configured for remotely controlling a trolling motor assembly. In this regard, the foot pedal may include various features, such as, but not limited to, a "momentary button" and/or "speed wheel" that can be selectively positioned on either the left or right side of the foot pedal assembly by the operator. Moreover, embodiments of foot pedal assemblies in accordance with the invention may be readily releasable from the deck of the watercraft to which the foot pedal assembly is secured (e.g., to facilitate the security of the foot pedal assembly when not in use). Additionally, some embodiments of the disclosed foot pedal assembly may include a variable speed feature that is activated via the corresponding momentary buttons.

FIGS. 3 through 4 show an example implementation of a user input assembly of a navigation control device according to various example embodiments in the form of a foot pedal assembly 130. The foot pedal assembly 130 may be one example of a user input assembly that, in some embodiments, includes a switch in the form of a pressure sensor 143 (FIG. 11) operated by a depressable momentary button 142 and/or pivotable foot pedal 136 (although in some embodiments, there may be no pressure sensor within the foot pedal assembly). The foot pedal assembly 130 may be in operable communication with the trolling motor assembly 100, via, for example, the processor 180 as described with respect to FIG. 11. Foot pedal assembly 130 includes a lever in the form of the foot pedal 136 that can pivot about a horizontal axis in response to movement of, for example, a user's foot. The foot pedal assembly 130 further includes a support plate 138 and a deflection sensor 182 (FIG. 11). The deflection sensor 182 may measure the deflection of the foot pedal 136 and provide an indication of the deflection to, for example, processor 180. In some embodiments, a speed input signal having an indication of a rate of rotation for the propeller 112 may be ultimately provided to the speed actuator 128 (FIG. 11) via a wired or wireless connection. The momentary switch 144 may, in some embodiments, form an ON/OFF button to selectively provide power to the foot pedal assembly 130. As detailed herein, in some embodiments, the momentary switch 144 may be configured or otherwise interact with a pressure sensor (or the like) to enable speed control of the trolling motor.

According to some example embodiments, the measured deflection of the foot pedal 136 may be an indication of the desired direction for the propulsion motor. In this regard, a user may cause the foot pedal 136 to rotate or deflect; and rotation of the foot pedal 136 in the counterclockwise direction (such that the left side of the illustrated foot pedal is tilted down) may cause the propulsion direction to turn to the left while rotation of the foot pedal 136 in the clockwise direction (such that the right side of the illustrated foot pedal is tilted down) may cause the propulsion direction to turn to the right.

While the foot pedal assembly 130 is shown as including the foot pedal 136 to control the rotation of the propulsion direction, the foot pedal assembly 130 also includes propulsion speed controls on the foot pedal assembly 130. As previously noted, in some embodiments, a pressure sensor (switch) for controlling the speed of the propeller 112 via the propulsion motor 111 may be operated by a user via the depressable momentary button 142. In some embodiments, as a user depresses the button 142 onto the corresponding pressure sensor, a pressure, or force, may be applied to the pressure sensor and the sensor measures the amount of pressure. As the amount of pressure on the button 142 is increased, the amount of pressure measured by the pressure sensor also increases. The speed of the propeller may be a function of the magnitude of the force measured by the pressure sensor. In this regard, as the amount of force exerted on the pressure sensor by the button 142 increases, the speed of the propeller 112 may also increase, for example, proportionally based on a linear or exponential function.

As shown, in some embodiments, the variable speed feature of the trolling motor assembly 100, as controlled by the depressable button 142 may be used in cooperation with the speed wheel 140. For example, the speed wheel 140 may be used to select a scale number between "0" and "10," thereby limiting the top end speed of the trolling motor assembly 100 that is achievable via depressing the button 142. For example, where a trolling motor assembly 100 has a maximum speed of 10 mph when the speed wheel 140 is set on scale number "10," the maximum speed achievable by the trolling motor assembly 100 will only be 5 mph when the speed wheel 140 is set on scale number "5." In short, a user exerting the same amount of force on the pressure sensor via the button 142 at a speed wheel setting of "5" will only cause the propeller 112 to rotate at half the speed than when the speed wheel is set on "10." Note, the use of a scale from "0 to 10" is only selected for the sake of example, other scales may be used to represent the range of speeds selectable by the user. As well, in alternate embodiments a linear-type input device, such as a slide, may be utilized rather than the rotary-type speed wheel to input speed control commands.

As well, in some example embodiments, the speed wheel 140 may be used to select a range of speeds within which the trolling motor assembly operates. For example, in addition to, or in place of, the previously discussed scale of "0" to "10," the speed wheel 140 may include ranges of speeds such as, but not limited to, "0-3," "3-6" and "6-10." As such, if a user select the range of "3-6," the trolling motor assembly will operate within that range when activated. Note, the noted ranges do not necessarily reflect actual speeds unless the top speed achievable by the trolling motor assembly 100 happens to be 10 mph.

Further, along similar lines, in some embodiments, the speed wheel may be utilized to enable or disable use of the momentary button for variable speed control. For example, the speed wheel may have a "variable" speed setting that enables such operation of the momentary button. In such a regard, in some embodiments, when disabled, the momentary button may revert back to simple ON/OFF functionality.

According to some example embodiments, a change with respect to time in the amount of force exerted on the pressure sensor 142 may be used to indicate a desired rate of speed for the propulsion motor 111. In this regard, if the button 142 is rapidly depressed, for example, from an origin position to being fully depressed, then the speed of the propulsion motor would be high. For example, with respect to the foot pedal assembly 130, if a user was to stomp on the button 142 to generate a rapid change in the force as measured by the pressure sensor with respect to time, then a high rate of desired speed may be determined by the processor 180. Likewise, if a user slowly depresses the button 142, then the processor 180 may determine a lower speed.

In some embodiments, instead of pressure sensors, the button 142 may operate to control speed based on time. In such an example embodiment, as a user depresses the foot pedal 136 onto the switch, the switch may transition to an active state. Further, a user may hold the foot pedal 136 in that position for a duration of time. The duration of time may be measured and as it increases, the speed of the propeller 112 may increase. In other words, holding the foot pedal 136 down longer can cause the speed of the propulsion motor to increase.

While the above example embodiments utilize pressure sensors that measure pressure, and duration of time of pressing, some embodiments of the present invention contemplate other types of sensors for correlating to a desired speed (e.g., capacitive, among others). Additionally, in some embodiments a separate user input could be used to define the speed (e.g., a separate button that could be pressed, toggled, moved, or dialed to define a desired speed). Further, while the above example embodiments utilize a foot pedal, some embodiments of the present invention contemplate use with other systems/structures, such as a touch screen, a user input assembly on the trolling motor or a remote marine electronics device.

Referring again to FIGS. 3 through 5, example embodiments of foot pedal assemblies in accordance with the present invention may include a depressable momentary button 142 that may be positioned on either the left or the right side of the housing of the foot pedal assembly 130. Depending on the desired configuration, the momentary button 142 may control whether power is supplied to the propulsion motor and/or the corresponding speed of the propulsion motor. As shown, the button 142 is positioned on the left side of the foot pedal assembly 130. As best seen in FIG. 5 the button 142 is disposed on a mounting structure 146 that is removably secured to the housing of the foot pedal 136 by a mounting strap 148.

In some embodiments, a pressure sensor that corresponds to the depressable button 142 is also disposed on the mounting structure 146. Note, however, the pressure switch may alternately be mounted to the housing of the foot pedal 136.

As indicated by the arrows 141 in FIG. 5, the mounting structure 146 is rotatable with respect to the housing of the foot pedal 136 such that the depressable button 142 may be disposed on either the left side or the right side of the foot pedal assembly 130. Once rotated to the desired position, the mounting structure 146 is disposed in a recess 137 formed in the top surface of the foot pedal 136 and secured thereto by the mounting strap 148 that is received in corresponding recesses 137 and 147 formed in the housing of the foot pedal 136 and the mounting structure 146, respectively. Preferably, the mounting strap 148 is secured to the housing of the pedal assembly 136 in via a snap-fit, although it may be secured thereto by threaded fasteners, etc.

Referring now to FIG. 6, in some embodiments, an example foot pedal assembly 230 may include a unitarily formed mounting structure 246 that may perform the functions of both the mounting structure 146 and the mounting strap 148 discussed with regard to the previous embodiment. As mounting structure 246 is not rotatable with respect to the housing of the foot pedal 136, a pair of apertures 149 and 151 is formed in the left side and the right side of the mounting structure 246, respectively. Each of the pair of apertures 149 and 151 is configured to selectively receive the depressable button 142 that engages the corresponding pressure switch. Preferably, a plug 150 having the same dimensions as the depressable button 142 is provided so that the plug 150 is also removably disposed in the apertures 149 and 151. Preferably, the plug 150 is disposed in the aperture that does not include the depressable button 142. As with the previously discussed embodiments, in some embodiments, the pressure switch that corresponds to the button 142 may either be disposed within the mounting plate 246 or may be disposed within the housing of the foot pedal 136.

In some embodiments, the button 142 and/or plug 150 may be configured to be received directly within the foot pedal housing 136 without a mounting structure 246. In such embodiments, the housing 136 may define apertures 149 and 151.

Referring now to FIG. 7, in some embodiments, an example foot pedal assembly 330 may include a speed wheel 140 that may be mounted directly to the mounting structure 346, which in turn is secured to the housing of the foot pedal 136 by the mounting strap 148. As such, the speed wheel 140 may be disposed on either the left side or the right side of the foot pedal assembly 100 by rotation of the mounting structure 346 with respect to the housing of the foot pedal 136. As shown, the mounting structure 346 may include a pair of apertures 349 and 351 that are configured to selectively receive either the depressable button 142 or the plug 150, as previously discussed. As such, a user may select to position the depressable button 142 and the speed wheel 140 on either the left side or the right side of the foot pedal assembly 100, independently of each other.

In some embodiments, the housing of the foot pedal 136 may include one or more electrical connection points 139 that are configured to receive one or more electrical connections, such as from the depressable button 142 and/or speed wheel 140. In some embodiments, such as shown in FIGS. 5 and 6, the electrical connection point 139 may be positioned proximate the center of the housing of the foot pedal 136, such as with respect to the mounting structure 146. In such example embodiments, one or more electrical connections from the mounting structure 146 and/or directly from the depressable button 142 and/or speed wheel 140 can be plugged into the electrical connection point 139 prior to selecting the desired position of the depressable button 142 and/or speed wheel 140. In some embodiments, multiple electrical connection points may be provided (e.g., one on each side of the housing of the foot pedal 136), such as to facilitate selective receipt of corresponding electrical connections from the depressable button 142 and/or speed wheel 140.

Referring now to FIGS. 8 and 9, in some embodiments the foot pedal assembly 430 may include a lock assembly 160 that is configured to releasably secure the foot pedal assembly 430 to the deck of the corresponding watercraft. For example, an embodiment may include a base plate 168 that is secured to the deck of the watercraft with a plurality of threaded fasteners 170, such as screws. The base plate 168 preferably includes a plurality of slots 164 that are configured to receive correspondingly shaped latches 162 that are rotatably secured to the support plate 138 of the foot pedal assembly 430. As shown, latches 162 are movable between a release position (R) and a lock position (L) by a user through the manipulation of corresponding levers 166. As shown, the latches 162 need only be rotated through approximately 90 degrees to both engage and disengage the latches 162 from the base plate 168. To secure the foot pedal assembly 430 to the base plate 168, a user positions the levers 166 in the release position (R) and inserts the latches 162 into the corresponding slots 164 of the base plate 168. With the latches 162 fully inserted, each latch 162 is then engaged with the base plate 168 by rotating its corresponding lever 166 to the lock position (L). To release the foot pedal assembly 430 from the base plate 168, the user simply rotates each lever 166 to its release position (R) and lifts upwardly on the foot pedal assembly 430. Note, although latches are discussed as a preferred embodiment, alternate embodiments of the foot pedal assembly 430 may be secured to the corresponding base plate 168 with cam locks, spring locks, snap locks, etc.

Referring now to FIG. 10, in some embodiments, the foot pedal assembly 530 may be releasably secured to the base plate 168 via a foot pedal mounting plate 172 that is disposed between the support plate 138 of the foot pedal assembly 530 and the base plate 168. In this embodiment, the foot pedal mounting plate 172 allows for a foot pedal assembly that is configured to be secured to the deck of a corresponding watercraft by threaded fasteners 170, such as screws, to instead be releasably secured to the corresponding base plate 168 utilizing the lock assembly 160 of the foot pedal mounting plate 172. Similarly to the previously discussed embodiment of FIGS. 8 and 9, the base plate 168 includes a plurality of slots 164, with the base plate 168 being secured to the deck of the corresponding watercraft with threaded fasteners 170. Foot pedal mounting plate 172, to which the support plate 138 of the foot pedal assembly 130 is secured with threaded fasteners 170, includes a plurality of latches 162 which include a corresponding plurality of levers 166 to allow for hand-operation by a user. With foot pedal assembly 530 fixedly attached to the foot pedal mounting plate 172, the foot pedal mounting plate is secured to the base plate 168 by insertion of the latches 162 into the slots 164, and rotation of the latches 162 via the corresponding levers 166 to the lock position (L) as previously discussed. To release the foot pedal assembly 530 from the base plate 168, the latches 162 are simply aligned with the corresponding slots 164 by rotating the levers to the release position (R), and the foot pedal assembly 530 is lifted upwardly away from the base plate 168.

Example System Architecture

FIG. 11 shows a block diagram of a trolling motor assembly 100 in communication with a navigation control device 131. As described herein, it is contemplated that while certain components and functionalities of components may be shown and described as being part of the trolling motor assembly 100 or the navigation control device 131, according to some example embodiments, some components (e.g., the autopilot navigation assembly 126, portions of the sonar assembly 118, functionalities of the processors 124 and 180, or the like) may be included in the other of the trolling motor assembly 100 or the navigation control device 131.

As depicted in FIG. 11, the trolling motor assembly 100 may include a processor 116, a memory 120, a speed actuator 128, a steering actuator 129, a propulsion motor 111, and a communication interface 124. According to some example embodiments, the trolling motor assembly 100 may also include an autopilot navigation assembly 126 and a sonar assembly 118.

The processor 116 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 116 as described herein. In this regard, the processor 116 may be configured to analyze electrical signals communicated thereto, for example in the form of a speed input signal received via the communication interface 124, and instruct the speed actuator to rotate the propulsion motor 111 (FIG. 2) and, therefore, propeller 112 (FIG. 2) in accordance with a received desired speed.

The memory 120 may be configured to store instructions, computer program code, trolling motor steering codes and instructions, marine data (such as sonar data, chart data, location/position data), and other data in a non-transitory computer readable medium for use, such as by the processor 116.

The communication interface 124 may be configured to enable connection to external systems (e.g., trolling motor assembly 100, a remote marine electronic device, etc.). In this manner, the processor 116 may retrieve stored data from remote, external servers via the communication interface 124 in addition to or as an alternative to the memory 120.

The processor 116 may be in communication with and control the speed actuator 128. Speed actuator 128 may be electronically controlled to cause the propulsion motor 111 to rotate the propeller at various rates (or speeds) in response to respective signals or instructions. As described above with respect to speed actuator 128, speed actuator 128 may be disposed in either the main housing 110 or the trolling motor housing 108, and is configured to cause rotation of the propeller in response to electrical signals. To do so, speed actuator 128 may employ a solenoid configured to convert an electrical signal into a mechanical movement.

The propulsion motor 111 may be any type of propulsion device configured to urge a watercraft through the water. As noted, the propulsion motor 111 is preferably variable speed to enable the propulsion motor 111 to move the watercraft at different speeds or with different power or thrust.

According to some example embodiments, the autopilot navigation assembly 126 may be configured to determine a destination (e.g., via input by a user) and route for a watercraft and control the steering actuator 129, via the processor 116, to steer the propulsion motor 111 in accordance with the route and destination. In this regard, the processor 116 and memory 120 may be considered components of the autopilot navigation assembly 126 to perform its functionality, but the autopilot navigation assembly 126 may also include position sensors. The memory 120 may store digitized charts and maps to assist with autopilot navigation. To determine a destination and route for a watercraft, the autopilot navigation assembly 126 may employ a position sensor, such as, for example, a global positioning system (GPS) sensor. Based on the route, the autopilot navigation assembly 126 may determine that different rates of turn for propulsion may be needed to efficiently move along the route to the destination. As such, the autopilot navigation assembly 126 may instruct the steering actuator 128, via the processor 116, to turn in accordance with different rates of turn as defined in a planned route. According to some example embodiments, a rate of turn during a route may be a function of, for example, the prevailing winds, ocean currents, weather considerations, or the like at the location of the turn.

The sonar assembly 128 may also be in communication with the processor 116, and the processor 116 may be considered a component of the sonar assembly 118. The sonar assembly 118 may include a sonar transducer that may be affixed to a component of the trolling motor assembly 100 that is disposed underwater when the trolling motor assembly 100 is operating. In this regard, the sonar transducer may be in a housing and configured to gather sonar data from the underwater environment surrounding the watercraft. Accordingly, the processor 116 (such as through execution of computer program code) may be configured to receive sonar data from the sonar transducer, and process the sonar data to generate an image based on the gathered sonar data. In some example embodiments, the sonar assembly 118 may be used to determine depth and bottom topography, detect fish, locate wreckage, etc. Sonar beams, from the sonar transducer, can be transmitted into the underwater environment and echoes can be detected to obtain information about the environment. In this regard, the sonar signals can reflect off objects in the underwater environment (e.g., fish, structure, sea floor bottom, etc.) and return to the transducer, which converts the sonar returns into sonar data that can be used to produce an image of the underwater environment.

As mentioned above, the trolling motor assembly 100 may be in communication with a navigation control device 131 that is configured to control the operation of the trolling motor assembly 100. In this regard, the navigation control device 131 may include a processor 180, a memory 184, a communication interface 186, and a user input assembly 130.

The processor 180 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 180 as described herein. In this regard, the processor 180 may be configured to analyze signals from the user input assembly 130 and convey the signals or variants of the signals, via the communication interface 186 to the trolling motor assembly 100 to permit the trolling motor assembly 100 to operate accordingly.

The memory 184 may be configured to store instructions, computer program code, trolling motor steering codes and instructions, marine data (such as sonar data, chart data, location/position data), and other data in a non-transitory computer readable medium for use, such as by the processor 180.

The communication interface 186 may be configured to enable connection to external systems (e.g., communication interface 124, a remote marine electronics device, etc.). In this manner, the processor 180 may retrieve stored data from a remote, external server via the communication interface 186 in addition to or as an alternative to the memory 184.

Communication interfaces 124 and 186 may be configured to communicate via a number of different communication protocols and layers. For example, the link between the communication interface 124 and communication interface 186 may be any type of wired or wireless communication link. For example, communications between the interfaces may be conducted via Bluetooth, Ethernet, the NMEA 2000 framework, cellular, WiFi, or other suitable networks.

According to various example embodiments, the processor 180 may operate on behalf of both the trolling motor assembly 100 and the navigation control device 131. In this regard, processor 180 may be configured to perform some or all of the functions described with respect to processor 116 and processor 180 may communicate directly to the autopilot navigation assembly 126, the sonar assembly 118, the steering actuator 129, and the speed actuator 128 directly via a wired or wireless communication.

The processor 180 may also interface with the user input assembly 130 to obtain information including a desired speed of the propulsion motor based on user activity. In this regard, the processor 180 may be configured to determine a desired speed of operation based on user activity detected by the user input assembly 130, and generate a speed input signal. The speed input signal may be an electrical signal indicating the desired speed. Further, the processor 180 may be configured to direct the speed actuator 128, directly or indirectly, to rotate the shaft of the propulsion motor 111 at a desired speed based on the speed indicated in the steering input signal. According to some example embodiments, the processor 180 may be further configured to modify the rate of rotation indicated in the speed input signal to different values based on variations in the user activity detected by the user input assembly 130.

Various example embodiments of a user input assembly 130 may be utilized to detect the user activity and facilitate generation of a steering input signal indicating a desired speed of propulsion motor. To do so, various sensors including feedback sensors, and mechanical devices that interface with the sensors, may be utilized. For example, a deflection sensor 182 and a pressure sensor 143 may be utilized as sensors to detect user activity with respect to a rate of turn of the trolling motor assembly 100 and speed of the shaft of the propulsion motor 111, respectively. Further, the foot pedal 136 and depressable momentary button 142 may be mechanical devices that are operably coupled to the sensors and may interface directly with a user to facilitate inputting a rate of turn by the user via the user input assembly 130 (i.e. foot pedal assembly).

According to some embodiments, the pressure sensor 143 may be used in conjunction with, for example, the depressable button 142 to determine a speed of the propulsion motor 111. In this regard, the pressure sensor 143 may be configured to detect an amount of force applied on the pressure sensor by a user and provide a force value to the processor 180 based on the detected amount of force. In turn, the processor 180 may be configured to determine a desired speed based on the force value. According to some preferred embodiments, higher detected amounts of force may indicate a higher desired speed. The rate of rotation may have a linear or exponential relationship to the force value.

According to some example embodiments, a desired speed may be determined based on a duration of time that a switch, such as switch 144, is in an active position. In this regard, switch 144 may have two states, an active state (e.g., "on") and an inactive state (e.g., "off"). According to some example embodiments, switch 144 may normally be in the inactive state (either biased open or biased closed) and user activity, such as actuation of the foot pedal 136 or the depressable button 142, may be required to place the switch 144 in the active state (that being closed for biased open switches or open for biased closed switches). When in the active state, a duration of time in the active state may be detected and the rate of turn may be a function of the duration of time that the switch 144 is in the active state.

Example Flowchart(s) and Operation

Embodiments of the present invention provide methods for assembling example trolling motor assemblies described herein. Various examples of the operations performed in accordance with embodiments of the present invention will now be provided with references to FIG. 12.

FIG. 12 illustrates a flowchart according to an example method assembling a user input assembly (i.e., a foot pedal assembly) according to an example embodiment 500. Operation 502 may comprise providing a foot pedal assembly with a selectively positionable momentary button (e.g., switch). Operation 504 may comprise providing the momentary button on a mounting structure that is selectively rotatable with respect to the user input assembly. Operation 506 may comprise rotating the mounting structure to the desired position with respect to the user input assembly. Operation 508 may comprise releasably securing the mounting structure to the user input assembly.

Embodiments of the present invention provide methods for assembling example trolling motor assemblies described herein. Various examples of the operations performed in accordance with embodiments of the present invention will now be provided with references to FIG. 13.

FIG. 13 illustrates a flowchart according to an example embodiment of mounting a user input assembly (i.e., a foot pedal assembly) to a watercraft according to an example embodiment 600. Operation 602 may comprise providing a foot pedal assembly including a releasable lock assembly. Operation 604 may comprise providing a base plate configured to releasably receive the lock assembly. Operation 606 may comprise affixing the base plate to the watercraft, and operation 608 may comprise releasably securing the base plate with the lock assembly of the foot pedal assembly to releasably secure the foot pedal assembly thereto.

Example embodiments 700 also include methods of controlling operation of a trolling motor assembly, as shown in FIG. 14 and discussed in the associated description. In this regard, FIG. 14 illustrates a flowchart of various operations that may, for example, be performed by, with the assistance of, or under the control of one or more of the processor 116 or 180, or with other associated components described with respect to FIG. 11 or otherwise herein and these components may therefore constitute means for performing the respective operations.

In this regard, the example method may include detecting user activity at a user input assembly at 702. According to some example embodiments, detecting user activity may include detecting an amount of force (pressure) on a pressure switch, detecting a rate at which an amount of force is applied to a pressure switch with respect to time, detecting a switch being in an active state, or the like. At 704, the example method may include determining a speed based on the user activity. In this regard, determining the speed may include determining a speed based on an amount of force on a pressure sensor, a rate at which an amount of pressure exerted on a pressure switch changes with respect to time, a duration of time that a switch is in an active state, or the like. Further, at 706, the example method may include generating, by a processor in operable communication with the user input assembly, a speed input signal. In this regard, the speed input signal may be an electrical signal indicating the desired speed. The example method may include, at 708, transmitting the speed input signal to a variable speed electric speed actuator, and, at 710, rotating a shaft of a propulsion motor, via the variable speed electric speed actuator, at a desired speed based on the speed indicated in the steering input signal. According to some example embodiments, the example method may further include modifying the speed indicated in the speed input signal to different values based on variations in the user activity detected by the user input assembly.

FIGS. 12-14 and the associated description illustrates a collection of operations of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120 or 184 and executed by, for example, the processor 116 or 180. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific teens are employed herein, they are used in a generic and descriptive sense only and not for purposes of limitation.

The invention claimed is:

1. A user input assembly for controlling operation of a trolling motor assembly, wherein the trolling motor assembly comprises a propulsion motor, the user input assembly comprising:
  a support plate;
  an input device housing pivotably mounted to the support plate, wherein the input device housing defines a top surface that is configured to receive a user's foot thereon, wherein the top surface defines a left edge and a right edge; and
  a switch that is selectively secured to the input device housing in one of a first position and a second position, wherein the first position is proximate the left edge of the top surface of the input device housing, wherein the second position is proximate the right edge of the top surface of the input device housing, wherein the switch is movable between an open position and a closed position, wherein the switch is biased to one of the open position and the closed position, and wherein power is supplied to the propulsion motor when the switch is moved from one of the biased open position to the closed position and the biased closed position to the open position;

wherein the input device housing defines one or more recesses that define both a first space and a second space to enable selective positioning of the switch in either the first space or the second space, wherein the first space is sized to receive the switch in the first position, and wherein the second space is sized to receive the switch in the second position.

2. The user input assembly of claim 1, further comprising: a mounting structure, wherein the switch is secured to the mounting structure, the mounting structure is removably secured to the top surface of the input device housing, and the mounting structure is rotatable with respect to the input device housing so that the switch is movable from the first position to the second position.

3. The user input assembly of claim 2, further comprising: a speed wheel, wherein the speed wheel is rotatably secured to the mounting structure, and the speed wheel is rotatable over a range of operating speeds of the propulsion motor.

4. The user input assembly of claim 1, further comprising: a mounting structure, wherein the mounting structure is removably secured to the top surface of the input device housing, wherein the mounting structure defines a first aperture that is configured to removably receive the switch.

5. The user input assembly of claim 4, wherein the mounting structure further defines a second aperture configured to removably receive the switch and the switch is positionable in either of the first aperture and the second aperture.

6. The user input assembly of claim 5, further comprising: a speed wheel, wherein the speed wheel is rotatably secured to the mounting structure, and the speed wheel is rotatable over a range of operating speeds of the propulsion motor.

7. The user input assembly of claim 1, wherein the switch further comprises a pressure sensor that is configured to detect an amount of force applied to the switch by a user, and the amount of force applied to the switch is related to a desired operating speed of the propulsion motor.

8. The user input assembly of claim 7, wherein the user input device is a foot pedal assembly and the pressure sensor further comprises a depressable button.

9. The user input assembly of claim 1, wherein the switch is configured to detect user activity related to controlling the speed of the propulsion motor.

10. The user input assembly of claim 9 further comprising a pressure sensor that is positioned relative to the switch to enable a user to apply different amounts of force to the pressure sensor when providing user activity to the switch, wherein the pressure sensor is configured to detect an amount of force applied to the pressure sensor by a user and provide a force value based on the detected amount of force that can be used to determine the desired speed.

11. The user input assembly of claim 1, wherein the user input assembly is used in a watercraft, the user input assembly further comprising:
a base plate that is configured to be affixed to the watercraft; and
at least one locking element configured to releasably attach the support plate to the base plate.

12. The user input assembly of claim 11, wherein the at least one locking element comprises a plurality of locking elements, wherein each locking element includes a projection and a corresponding aperture for releasably receiving the corresponding projection, wherein each projection is secured to the support plate and each corresponding aperture is disposed in a fixed position on the watercraft, wherein each projection is releasably received by the corresponding aperture so that the support plate is secured to the watercraft, and each projection is configured to be selectively removed from the corresponding aperture by the user without a tool.

13. The user input assembly of claim 12, wherein each projection further comprises a latch that depends downwardly from a bottom surface of the support plate, and wherein each latch includes a lever that is configured to allow the user to rotate the corresponding latch between a lock position in which the latch both extends into and is secured within the corresponding aperture, thereby securing the support plate to the watercraft, and a release position in which the user may remove the corresponding latch from the corresponding aperture.

14. The user input assembly of claim 11, wherein the support plate defines a plurality of apertures, wherein each latch is rotatably received in a corresponding aperture of the support plate.

15. A trolling motor system comprising:
a trolling motor assembly comprising a propulsion motor and a propeller, wherein the propulsion motor is variable speed and configured to rotate the propeller at a desired speed in response to an electrical signal;
a user input assembly comprising:
a support plate;
an input device housing pivotably mounted to the support plate, wherein the input device housing defines a top surface that is configured to receive a user's foot thereon, wherein the top surface defines a left edge and a right edge; and
a switch that is selectively secured to the input device housing in one of a first position and a second position, wherein the first position is proximate the left edge of the top surface of the input device housing, wherein the second position is proximate the right edge of the top surface of the input device housing, wherein the switch is movable between an open position and a closed position, wherein the switch is biased to one of the open position and the closed position, and wherein power is supplied to the propulsion motor when the switch is moved from one of the biased open position to the closed position and the biased closed position to the open position; and
a processor configured to direct the propulsion motor to rotate the propeller;
wherein the input device housing defines one or more recesses that define both a first space and a second space to enable selective positioning of the switch in either the first space or the second space, wherein the first space is sized to receive the switch in the first position, and wherein the second space is sized to receive the switch in the second position.

16. The trolling motor system of claim 15, wherein the switch is configured to detect user activity related to controlling the desired speed of the propulsion motor, and wherein the processor is further configured to:
determine the desired speed based on user activity detected by the switch of the user input assembly;

generate a speed input signal, the speed input signal being an electrical signal indicating the desired speed; and direct the propulsion motor, via the speed input signal, to rotate the propeller via the propulsion motor at the desired speed based on the speed indicated in the speed input signal.

17. The trolling motor system of claim 16, wherein the user input assembly is a foot pedal assembly and the switch further comprises a pressure sensor, wherein the pressure sensor is configured to detect an amount of force applied to the pressure sensor by a user and provide a force value based on the detected amount of force, and the processor is further configured to determine the desired speed based on the force value.

18. The trolling motor system of claim 15, further comprising:

a mounting structure, wherein the switch is secured to the mounting structure, the mounting structure is removably secured to the top surface of the input device housing, and the mounting structure is rotatable with respect to the input device housing so that the switch is movable from the first position to the second position.

19. The trolling motor system of claim 15, further comprising:

a mounting structure, wherein the mounting structure is removably secured to the top surface of the input device housing, wherein the mounting structure defines a first aperture that is configured to removably receive the switch.

20. A user input assembly for controlling operation of a trolling motor assembly, wherein the trolling motor assembly comprises a propulsion motor, the user input assembly comprising:

a support plate;

an input device housing pivotably mounted to the support plate, wherein the input device housing defines a top surface that is configured to receive a user's foot thereon, wherein the top surface defines a left edge and a right edge; and a switch that is selectively secured to the input device housing in one of a first position and a second position, wherein the first position is proximate the left edge of the top surface of the input device housing, wherein the second position is proximate the right edge of the top surface of the input device housing, wherein the switch is movable between an open position and a closed position, wherein the switch is biased to one of the open position and the closed position, and wherein power is supplied to the propulsion motor when the switch is moved from one of the biased open position to the closed position and the biased closed position to the open position; and a mounting structure, wherein the switch is secured to the mounting structure, the mounting structure is removably secured to the top surface of the input device housing, and the mounting structure is rotatable with respect to the input device housing so that the switch is movable from the first position to the second position.

* * * * *